July 2, 1929.  J. C. BARNABY  1,719,643

INTERNAL COMBUSTION ENGINE

Filed Aug. 4, 1927

JAMES C. BARNABY.
INVENTOR

BY

ATTORNEY.

Patented July 2, 1929.

1,719,643

UNITED STATES PATENT OFFICE.

JAMES C. BARNABY, OF WESTERLEIGH, NEW YORK, ASSIGNOR TO WORTHINGTON PUMP AND MACHINERY CORPORATION, OF NEW YORK, N. Y., A CORPORATION OF VIRGINIA.

INTERNAL-COMBUSTION ENGINE.

Application filed August 4, 1927. Serial No. 210,519.

This invention relates to improvements in internal combustion engines of the Diesel type and more particularly to solid injection engines of such type which have pre-combustion chambers to obtain a thorough commingling of the fuel oil and compressed air in advance of combustion.

Considerable difficulty has been experienced in internal combustion engines of the Diesel type in providing proper cooling for the pre-combustion chamber. In approved types of construction wherein the surfaces of the pre-combustion chamber were in direct contact with water or cooling fluid, one of the principal sources of annoyance which affected the operation of the engine is that elimination of leakage of water past the joint and into the cylinder of the engine is practically impossible, especially with extended operation of the engine, and such leakage materially affects the combustible mixture and consequently the efficiency of the engine.

An object of the present invention is to provide a pre-combustion chamber structure which will eliminate such leakage in that the chamber does not have engagement with the cooling fluid but is so designed that it presents a maximum surface for contact with water cooled parts of the cylinder head of the engine to permit maximum cooling and diffusion of heat and also permits easy removal of the pre-combustion chamber for replacement or repair.

With these objects in view, the invention consists in various features of construction and combination of parts, which will be first described in connection with the accompanying drawings, showing an internal combustion engine of the preferred form embodying the invention, and the features forming the invention will be specifically pointed out in the claims.

In the drawings—

Figure 1:
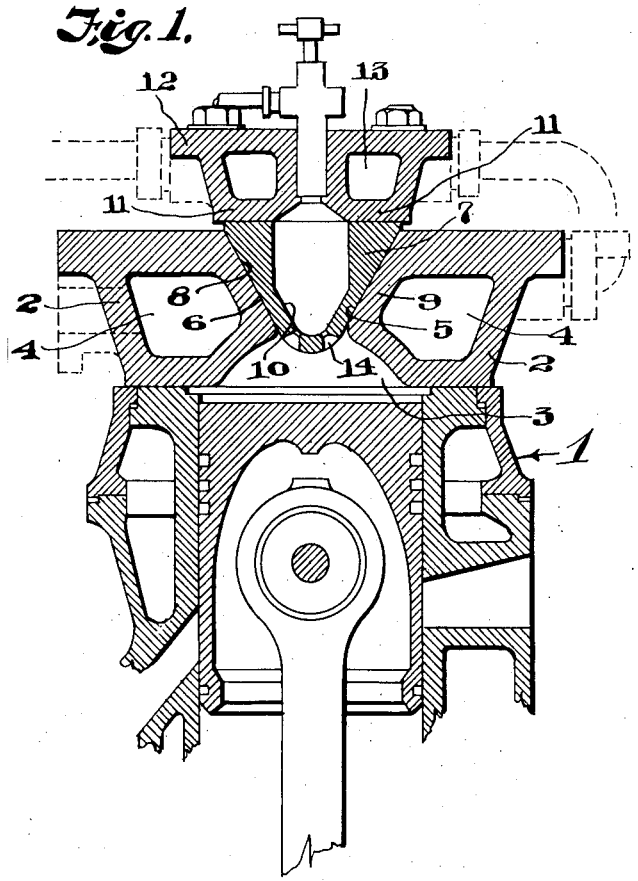
Figure 1 is a fragmentary section through an internal combustion engine showing the improved cylinder head.
Figure 3:
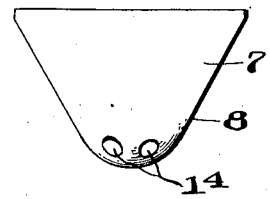
Figure 3 is a side elevation of the movable pre-combustion chamber.
Figure 2:
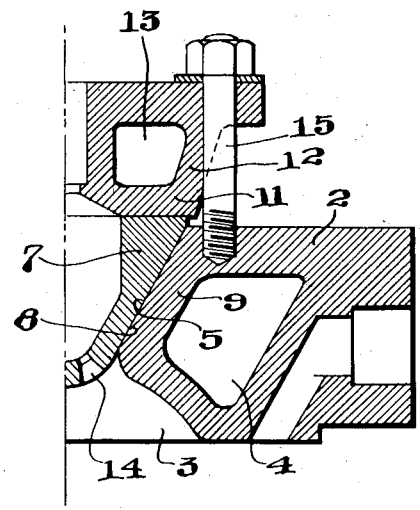
Figure 2 is a fragmentary section of the cylinder head taken at a different point from the section shown in Figure 1.
Figure 4:
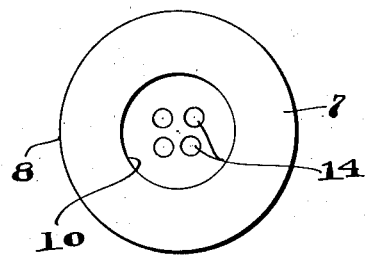
Figure 4 is a top plan of a pre-combustion chamber.

Referring more particularly to the drawings, the improved cylinder head structure is shown as associated with the cylinder structure 1 of an internal combustion engine of any approved form, preferably of the Diesel type. The cylinder head 2 which is attached in any suitable manner to the engine 1 is provided with a combustion chamber 3, cooling water space 4 and has a central opening 5 the side edges 6 of which incline inwardly towards the axis of the cylinder head 2 from the upper end or side of the cylinder head. A pre-combustion chamber forming member 7 is mounted in the opening 5 and it is substantially in the shape of an inverted cone having inclined surfaces 8 of relatively sharp angles which fit tightly against the corresponding inclined surfaces 6 of the opening 5, providing a relatively large area of metal for contact with the water cooled walls 9 of the opening 5 so as to provide maximum cooling of the member or casting 7. The member or casting 7 is provided with a recess 10 which forms the pre-combustion chamber and the lower portion of this recess tapers correspondingly to the taper or incline of the outer surface of the member 7, while the upper portion of the recess is of uniform diameter thereby providing thickened metal at the top of the member 7 as clearly shown in Figures 1 and 2 of the drawings. The thickened upper portion of the member 7 also provides increased metal and surface for engagement with the water cooled walls or sections 11 of the spray valve carrying clamping member 12. The spray valve carrying and clamping member 12 is provided with a cooling water circulating passage 13, which permits cooling of the walls 11.

Besides providing increased surfaces for contact with cooled surfaces of the cylinder head structure, the substantially conical shape of the pre-combustion chamber forming member 7 also permits its ready removal from the cylinder head for purposes of replacement or repair. The member 7 is provided with a plurality of openings 14 which open from the pre-combustion chamber 10 into the combustion space 3. The member 12 may be attached to the cylinder head 2 by bolts or analogous fastening devices as shown at 15 in Figure 2 of the drawings.

It will be understood that the invention is not to be limited to the specific construction or arrangement of parts shown but that these may be modified widely within the invention defined by the claims.

What is claimed is:

1. In an internal combustion engine, the combination with a cylinder head having water cooled surfaces, of a substantially conical shaped pre-combustion chamber forming member, having maximum surface contact with the water cooled surfaces of the cylinder head, and having the cross sectional area of its walls increased at predetermined points for distributing heat from its apex to its sides and base.

2. In an internal combustion engine, the combination with a cylinder head having water cooled surfaces, of a substantially conical shaped pre-combustion chamber forming member, removably engaging the cylinder head and having maximum surface contact with the water cooled surfaces of the cylinder head and having the cross sectional area of its walls increased at predetermined points for distributing heat to desired portions of the member.

3. In an internal combustion engine, the combination with a cylinder head having water cooled surfaces, of a substantially conical shaped pre-combustion chamber forming member, removably engaging the cylinder head and having maximum surface contact with the water cooled surfaces of the cylinder head and having the cross sectional area of its walls increased at predetermined points for distributing heat to desired portions of the member, a clamping member engaging said pre-combustion chamber forming member, for holding it in position, said clamping member having a water cooled surface for engagement with the base of the conical pre-combustion chamber forming member.

4. In an internal combustion engine, the combination with a cylinder head having water cooled surfaces, of a substantially conical shaped pre-combustion chamber forming member removably seated in the cylinder head and having maximum surface contact with water cooled surfaces of the cylinder head, a clamping member engaging said pre-combustion chamber forming member for holding it in position, said clamping member having a water cooled surface for engagement with the base of the conical pre-combustion chamber forming member.

5. In an internal combustion engine, the combination with a cylinder head having water cooled surfaces, and a substantially conical shaped opening, opening out at its inner end into the combustion chamber of the engine of a pre-combustion chamber forming member, removably seated in said substantially conical shaped opening, said chamber forming member having surface contact with the entire wall surface of said substantially conical shaped opening to permit cooling of the chamber forming member.

6. In an internal combustion engine, the combination with a cylinder head having water cooled surfaces and a substantially conical shaped opening, opening out at its inner end into the combustion chamber of the engine of a pre-combustion chamber forming member removably seated in said substantially conical shaped opening, said chamber forming member having surface contact with the entire wall surface of said substantially conical shaped opening to permit cooling of the chamber forming member and a clamping member engaging said chamber forming member for holding it in position, said clamping member having a water cooled surface for engagement with the chamber forming member.

In testimony whereof I affix my signature.

JAMES C. BARNABY.